United States Patent [19]

Teague et al.

[11] 4,329,090

[45] May 11, 1982

[54] EMPLOYING QUICKLIME IN STABILIZING SURFACE LAYERS OF THE EARTH

[76] Inventors: Joe D. Teague, 4813 Black Oak La., Fort Worth, Tex. 76114; Paul J. Wright, 1207 Sotogrande Blvd., Apt. 315, Euless, Tex. 76039

[21] Appl. No.: 109,791

[22] Filed: Jan. 7, 1980

Related U.S. Application Data

[63] Continuation-in-part of Ser. No. 969,421, Dec. 14, 1978, Pat. No. 4,233,015.

[51] Int. Cl.³ .............................................. E02D 3/14
[52] U.S. Cl. ...................................... 405/263; 366/7; 210/219
[58] Field of Search ............... 366/144, 4, 7; 405/263, 405/264, 266, 268, 269, 270; 210/219

[56] References Cited

U.S. PATENT DOCUMENTS 3,651,002  3/1972  Nakamura ........................... 405/263
3,971,222  7/1976  Griffith ............................... 405/263
4,084,381  4/1978  Cain .................................... 405/266

Primary Examiner—Robert W. Jenkins
Attorney, Agent, or Firm—James C. Fails

[57] ABSTRACT

This specification discloses method and apparatus for treating surface layers of the earth to obtain stabilization, build strength and permeability characteristics; characterized by slaking quicklime (CaO) in a mixing tank to form an elevated temperature, hydrated lime [Ca(OH)$_2$] slurry and working the resulting elevated temperature lime slurry into the surface of the earth at the local where the stabilization of the soil is to be achieved. This achieves a cost reduction, has greater reliability in obtaining materials, achieves better results, saves energy and extends the soil-stabilization season into cold weather previously considered prohibitive. Also disclosed are the details of preferred embodiments for admixing the unslaked lime.

7 Claims, 5 Drawing Figures

EMPLOYING QUICKLIME IN STABILIZING SURFACE LAYERS OF THE EARTH

CROSS REFERENCE TO RELATED APPLICATIONS

This application is a continuation-in-part of patent application Ser. No. 969,421, filed Dec. 14, 1978 in the U.S. Patent and Trademark Office and entitled "EMPLOYING QUICKLIME IN STABILIZING EARTH;" same inventors; now U.S. Pat. No. 4,233,015.

BACKGROUND OF THE INVENTION

1. Field of the Invention

This invention relates to treating surface layers of the earth to stabilize the surface layers for foundations, roadways, building and the like.

2. Description of the Prior Art

The prior art is replete with a wide variety of materials that have been employed to stabilize soils, or improve subgrades in surface and subsurface layers for a variety of purposes. The applications have been as varied as improving subgrades for building sites, streets, runways, railroads, dewatering projects and more recently improving the slopes for preventing failure thereof. Of course, pretreating building sites for improving the strength and volume change characteristics of soils has long been a problem plaguing the civil engineer and the architectural engineer. The problems have been varied and the techniques have been varied to try to overcome them. Lime slurries have been worked into the top layers; for example, the top 6-36 inches in depth to improve and stabilize soils or subgrades. This working of lime into the surface layers of the earth has been well publicized. For example, Bulletin 326 entitled "LIME STABILIZATION CONSTRUCTION MANUAL," published by the National Lime Association, Washington, D.C., 1972 chronicles various methods of working lime into the surface layers and the improved results obtained by stabilizing the base. For example, at page 7 there are detailed the improved results of incorporating lime into the soil. That manual even discloses the injection of pebbles of quicklime into the soil. These pebbles of quicklime do not work satisfactorily, however.

Since the advent of the energy crisis, the price of hydrated lime has risen dramatically. Moreover, prices continue to rise steadily as this is a highly energy-dependent system. Furthermore, in certain parts of the United States, difficulty is frequently experienced in obtaining adequate quantities of hydrated lime (calcium hydroxide).

Thus it can be seen that the prior art has not been totally satisfactory in providing an economical process in which the starting materials were always available at an economical price.

Moreover, one of the deficiencies of the prior art has been the attempt to work lime slurry, with or without additives, into the soil during cold weather or the winter season when ambient temperatures would cause the slurry to freeze, either in the mixing tanks, conduits, or pumps; or the cold slurry would not react readily with the soils, since full and final chemical reactions were temperature dependent. Thus there was a limited season and it was desirable that the season be extended by some method.

SUMMARY OF THE INVENTION

Accordingly, it is an object of this invention to provide method and apparatus that can be employed to stabilize surface layers of the earth economically and employ economical and readily available starting materials, thereby obviating the deficiencies of the prior art.

It is a specific object of this invention to provide method and apparatus that are economical, employ economical, readily available starting materials; achieve improved results; and extend the season of operability of working lime slurries into the surface layers.

These and other objects will become apparent from the descriptive matter hereinafter, particularly when taken in conjunction with the appended drawings.

In one embodiment of this invention, there is provided a method of treating surface layers of the earth to achieve improved stability, characterized by admixing in a slurry mixing tank quicklime (CaO) and water to form an elevated temperature, hydrated lime [$Ca(OH)_2$] slurry; and (b) working the hot lime slurry into the surface of the earth to desired depths such that the surface layers are stabilized in-situ with the improved results attendant thereto. In the preferred embodiment, the particulate solids are in the slurry within a range of 20-50 percent by weight of the water.

In another embodiment of this invention there is provided apparatus for working lime slurry into the surface of the earth and including apparatus for spraying the lime slurry onto the surface of the earth and the interconnecting conduits, and an improvement characterized by:

(a) a mixing tank having a predetermined water level to which water is filled before admixing with the unslaked lime;

(b) mixing means for admixing the quicklime particles into the water;

(c) means for heating the water in order to speed slaking of the quicklime;

(d) means for adding the quicklime to the water in the mixing tank;

(e) suction line for connecting with the injection equipment;

(f) screening means connected serially with the suction line for screening out large solid particles that are not efficacious in the process.

In the preferred embodiment of the apparatus the mixing means comprises:

(a) spirally arranged paddles sloped to pull the quicklime particles along the bottom of the mixing tank toward one end and affixed to a rotatable shaft; and (b) rotating means for rotating the shaft; the rotating means being connected with the shaft;

the means for heating the water employs the exothermic slaking reaction for the heating and includes, for example;

(c) first inlet conduit extending for a second predetermined distance below the predetermined water level for admixing the quicklime below the water level to heat the water and to form a hot dilute lime slurry.

If desired the means for adding the quicklime can include a second inlet conduit and foraminous, or perforated, baffle for blowing the quicklime into and forwardly and rearwardly onto the surface of the lime slurry, alone or in combination with the injection and admixing below the surface of the water, for more rapid mixing.

Ordinarily, the CaO is available in pellet form and is transferred pneumatically into the slaking, or mixing tank which contains the desired quantity of water.

DESCRIPTION OF THE PREFERRED EMBODIMENTS

Figure 1:
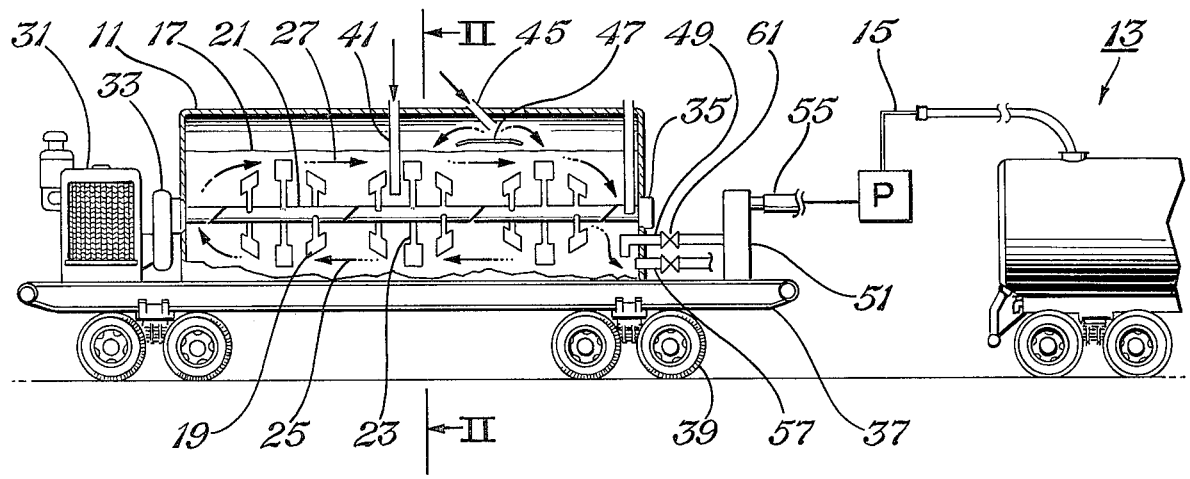
FIG. 1 is a partial cross sectional view, partly schematic, illustrating a mixing tank for slaking the quicklime in water and apparatus for spreading the resulting hydrated lime slurry in accordance with this invention.

This invention is very useful for stabilizing surface layers of the earth over a longer season than has been heretofore possible and employs an economical, more readily available material than has been heretofore possible.

Water that is employed in the lime slurry that is worked into the surface layers of the earth may be any of the water from economical and normally employed sources. Usually, the job will be close enough to the conventional water supply that the conventional source of water can be employed. A conventional source may comprise city water mains, railroad storage facilities, highway department storage facilities, lakes, streams, and the like. Preferably, the water will not have a high concentration of materials that will react with the lime that is added into the slurry.

The lime that is employed in the slurry in accordance with this invention is a conventional quicklime, or calcium oxide. The quicklime may be either dolomitic or high calcium lime; although the high calcium lime is normally used. The lime that is employed may have minor amounts of other impurities therein but will ordinarily analyze better than 90% by weight calcium oxide. The more nearly it analyzes toward 100% calcium oxide, the better are the results.

The quicklime is ordinarily available in the form of small pellets (approximately $\frac{1}{4}''-\frac{1}{2}''$) and is easier to unload than hydrated lime and causes less dusting.

Care has to be taken when slaking the quicklime to achieve proper slaking and breakdown of the lime and to avoid hazards to workmen and the like. These precautions and procedures will be discussed in more detail later hereinafter.

One of the reactions that occurs when lime slurry is worked into surface layers, or soils, is the pozzolanic or cementing action in which the calcium hydroxide interacts with the siliceous and aluminous components of the soil to increase the strength and stability of the soil. The resulting reaction products are water insoluble and render the fissures that are normally in the soil serving as flow paths to water, impervious to flow of water. In addition, materials that are formed stabilize the surface of the soils to achieve a wide variety of beneficial results for the construction industry.

In the slurry of this invention the particulate solids, such as the lime, are present in a proportion within the range of 20-50 percent by weight of water. Of course, any range can be employed as desired and the proportions vary widely, depending on the application, soil needs and the like.

The remainder of the slurry is water.

In operation the hot lime slurry is worked into the surface of the earth by any one of the methods described in the Bulletin number 326 "LIME STABILIZATION CONSTRUCTION MANUAL" referenced hereinbefore.

A wide variety of rigs have been employed to spray the hot lime slurry onto the surface of the earth, and work it into the surface of the earth; simultaneously work and spray, admixing the bulk of the surface layers with the hot lime slurry in accordance with this invention; or the like. For example, if desired, the top surfaces of the earth may be scraped up, admixed with the hot lime slurry and then laid down again, although this is ordinarily more expensive and less desirable than merely working the hot lime slurry of this invention directly into the surface layers, as by discing, grading and the like. The worked surface layers with the hot lime slurry admixed with the soil components may then be compacted as desired.

Before the admixing of the hot lime slurry actually takes place, it is preferable to run engineering tests to determine the appropriate percentage of lime to be added to stabilize the soil. A typical percentage is about six percent (6%) by volume.

Also, the type of hot lime slurry to be employed is determined. After the determination of the type of hot lime slurry to be employed (alone or with additional material such as fly ash) one or two bulk mixing tanks are placed on the job as close as possible to the site, or location, where the lime slurry is to be worked into the surface. Mixing tanks are also preferably located near water and near an all weather road surface so that bulk quicklime deliveries can be made regardless of the weather. The mixing tanks may be of any size. We have employed ten foot by thirty foot tanks. This size allows mixing an entire load of solids at one time, assuring a uniform mixture for each load. As will become apparent from the descriptive matter later hereinafter, each of the slurry tanks is equipped with mechanical agitators to form a more nearly uniform slurry than would otherwise be possible.

After the lime slurry has been worked into the surface layer, one to several days are provided to allow time for the lime to cure with the soil. If desired, subsequent lime slurry workings can be employed.

In any event the lime slurry that has been heated by the exothermic slaking chemical reaction and worked into the surface layers reacts to cement together the constituents to form a high strength stabilized layer.

As implied hereinbefore, with this invention, there are special procedures and special equipment necessary to effect admixing of the quicklime with the water to form the hot lime slurry that is ultimately worked into the surface layers.

Referring to FIG. 1, there is illustrated a mixing tank 11 in which the quicklime is admixed with water to form the hot hydrated lime slurry that is ultimately carried by the transport equipment 13 for admixing into the surface layers. Transport equipment 13 is connected as by way of interconnecting conduits 15 with the mixing tank 11. The mixing tank has a predetermined water level 17 to which the water is filled before the quicklime is added. In the illustrated embodiment where a ten foot tank is employed, the water level may be in the range of 5-7 feet; for example, about 6 feet. This proportion of filling of a mixing tank, regardless of size, has been found to be operable without creating hazards. Interiorly of the mixing tank are a plurality of mixing paddles 19 arranged in at least one spiral. As illustrated, the mixing paddles are arranged in two spirals, one on each side of the rotatable shaft 21 to which they are connected by suitable arms 23. The paddles 19 angle so as to cause the particles of lime to flow along the bottom, as shown by the arrows 25, FIGS. 1 and 4, and spirally intermix with the water, causing a return flow along the top, as shown by arrows 27. The paddles may be of mild steel or any other suitably strong material and may be used in combination with flexible paddles; such as plastic, Noeprene, or other synthetic rubber, or belting having rubber around heat resistant fibers, like fiber glass fibers or the like. It is necessary that they be able to withstand temperatures near the boiling point of water because of the heat that will be engendered by the exothermic reaction of slaking the quicklime by admixing the quicklime with the water. A rotation means, such as engine 31 and gear box 33, are employed to rotate the shaft 21 and, consequently, the paddles 19. A rotational speed in the range of 30-90 revolutions per minute (rpm) has been found to be satisfactory. The shaft 21 is journalled in suitable bearings 35 mounted in each end of the mixing tank 11. As illustrated, the mixing tank 11 is mounted on skids 37 as well as its own wheels 39 to facilitate portability.

Figure 2:
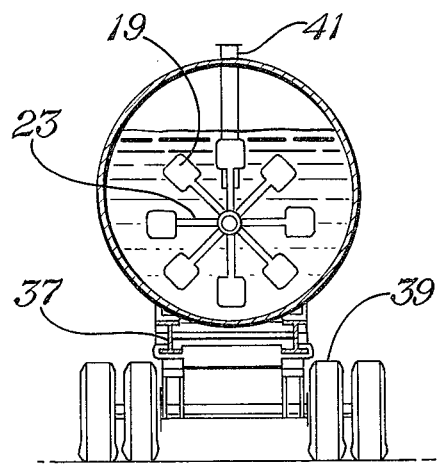
FIG. 2 is a cross sectional view taken on lines II—II of FIG. 1.

Referring to FIGS. 1 and 2, a first inlet conduit 41 is provided in the top of the mixing tank and extends for a predetermined distance below the predetermined water level 17 for admixing the quicklime below the level of the water to form a hot dilute lime slurry. For example, the quicklime pellets may be sent from a hopper through the inlet conduit 41 or blown through suitable pneumatic transport conduits into the inlet conduit 41. It has been found advisable to keep workmen off the tank during the admixing of the quicklime, since the temperature rapidly climbs. Earlier attempts to admix the quicklime formed cakes on the top of the water and steam below the cake such that there was blowing upwardly of the cakes with the resultant danger to personnel and equipment. This has been obviated by the entry of the quicklime below the surface of the water, in conjunction with the spiralling paddles to give a mixing flow and configuration such as illustrated schematically in FIG. 4.

It is vital that at least initial mixing is done under water. It is theorized that slaking of each pellet of quicklime is like a miniature volcano and explosion. In any event and regardless of whether or not this theory is correct the dramatic slaking is attenuated by thorough mixing so that the temperature climbs throughout the slurry and not just locally. Moreover, the dangerous formation of an enclosing crust and pressure buildup of steam under the crust is avoided by the underwater mixing coupled with the sweeping and mixing effected by the spirally arranged paddles. The entire mixing can be done this way. Up to 20 ton loads of quicklime can be readily admixed to form a hot hydrated lime slurry equivalent in volume to 25 tons of hydrated lime and superior in application results to the usual hydrated lime slurry.

If admixing more rapidly is desired, on the other hand, the initial subsurface mixing may be employed to obtain a temperature in the range of 140°-160° F., 60°-71° C. and thereafter another form of mixing can be employed, instead of and/or in addition to the subsurface mixing. Specifically, as illustrated, there is provided a second inlet conduit 45 and a foraminous, or perforated, baffle 47 for distributing the quicklime into and forwardly and rearwardly onto the surface of the dilute hot lime slurry initially formed. This allows more rapidly completing the mixing of the quicklime to form the desired final hot lime slurry.

A suction line 49 is provided for connecting the transport equipment by way of the interconnecting conduits 15.

Figure 3:
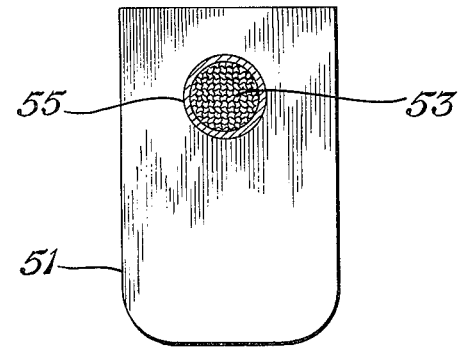
FIG. 3 is a front elevational view of the screening apparatus of FIG. 1.

A screening means such as the screen chamber 51 is connected serially into the suction line for screening out solid particles that did not slake and are not efficacious in the surface working process. Specifically, the screen chamber 51 has a metallic screen 53, FIG. 3 over the effluent conduit 55 to trap the larger particles so they can be removed from the screen chamber 51.

Figure 4:
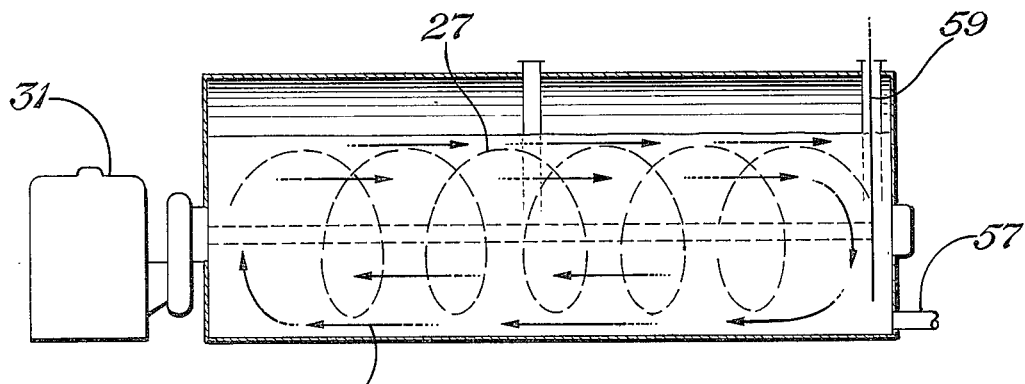
FIG. 4 is a schematic illustration showing the mixing pattern of the embodiment of FIG. 1.

If it is desired to bypass the screen chamber 51, a suction conduit 57 may be provided. As can be seen in FIG. 4, the suction conduit 57, or the conduit 49, has an air line 59 terminating adjacent the entry thereinto for blowing away debris and the like that would tend to block the entry to the suction conduit. Valves such as valves 61 were employed on the suction line to prevent stopping up the suction lines during the slaking process.

In the admixing of the quicklime to form the lime slurry, the mixing tank 11 has water added to a predetermined water level to achieve the desired mixture.

The quicklime is added through the inlet conduit 41. The inlet conduit 41 may terminate about one foot to two feet; for example, about 18 inches; below the water level to get the quicklime into the water without forming caking on the surface of the water. The quicklime that has been introduced into the water is stirred into the water to slake and admix with the water to form a hot dilute lime slurry. The stirring forms a more nearly uniform distribution of the quicklime and the temperature throughout the slurry than would otherwise be possible. The quicklime is added through the inlet conduit 41 at least initially while simultaneously stirring the slurry and entering quicklime as described hereinbefore. The subsurface injection is continued until the hot dilute slurry reaches a first temperature in the range of 140°-160° F., 60°-71° C. The subsurface injection may be used for the entire mixing of the hot lime slurry. If, however, the quicklime is to be injected and mixed more rapidly it is also injected, after the first temperature is reached, through the second conduit 45 and is spread forwardly and rearwardly, as well as directly on top of the hot dilute slurry, by the foraminous baffle 47. Thorough mixing is continued to prevent forming a dangerous crust and steam build-up until the desired proportion of lime is formed in the inal slurry. Specifically, the rotating shaft and paddles cause the mixing pattern illustrated in FIG. 4. The temperature may climb to as much as 195° F. or more in the mixing tank.

After the quicklime has slaked and formed an elevated temperature lime slurry, it is subsequently transported by the transport equipment 13 to the site for being admixed into the surface layers as described hereinbefore.

Figure 5:
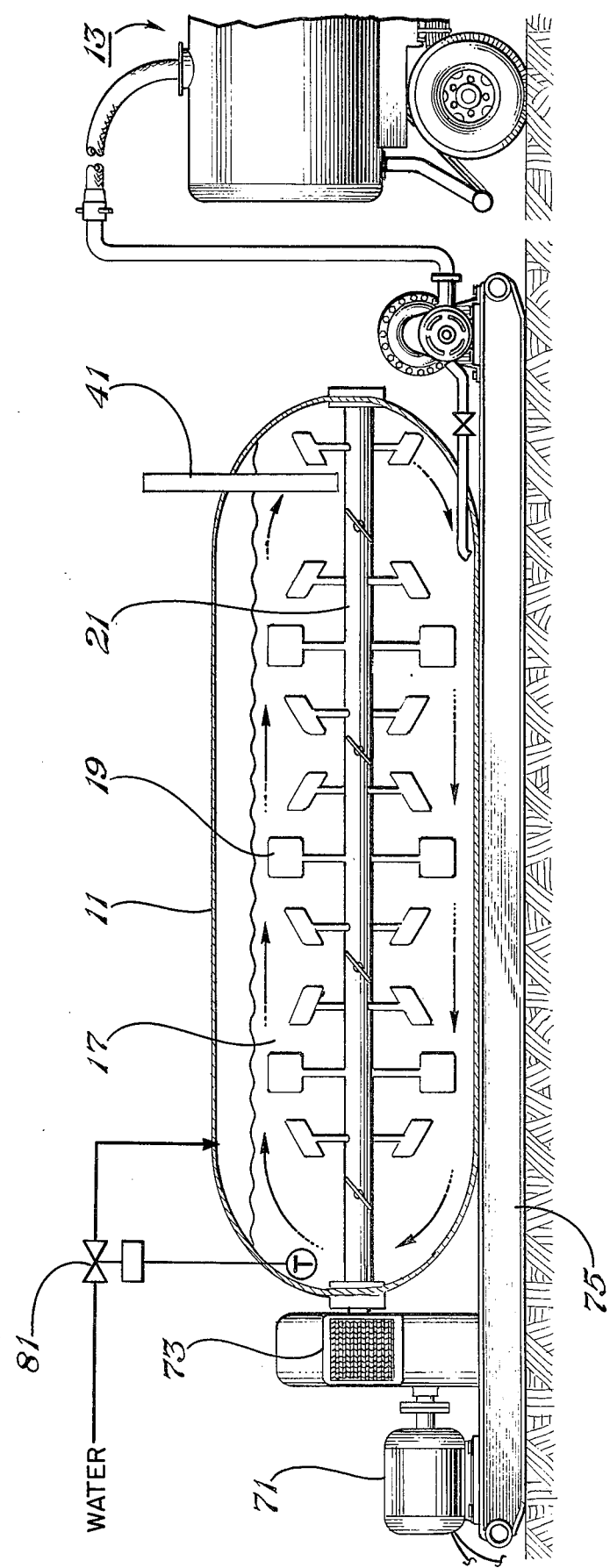
FIG. 5 is a partial cross sectional view, partly schematic, illustrating a skid mounted but relatively stationary mixing tank for slaking quicklime in water at a site.

Another embodiment of this invention is illustrated in FIG. 5. Therein the same elements are referred to generically by the same reference numerals. For example, the mixing tank 11 is provided for slaking the quicklime and the transportation equipment 13 is provided for transporting the hot lime slurry. The mixing tank has a predetermined water level 17 to which water is filled before the quicklime is added. Interiorly of the mixing tank are a plurality of mixing paddles 19 arranged in at least one spiral. As illustrated, the mixing paddles are arranged in two spirals, one on each side of the rotatable shaft 21 as described hereinbefore. The paddles 19 are angled so as to cause the particles of lime to flow along the top and bottom as shown by the arrows in FIGS. 1 and 4. The paddles and their interconnecting members may be as described hereinbefore. The rotation means illustrated this time is the electric motor 71 and hydraulic drive unit 73 effecting rotation of the shaft 21 and consequently, the paddles 19. The electric motor and hydraulic drive unit may comprise any of the conventional units on the market that develop sufficient torque. As illustrated, the electric motor 71 will drive a hydraulic pump, that will in turn, power hydraulic motor with suitable gearing to effect the rotation of the shaft 21 in the range of 30–91 revolutions per minute delineated hereinbefore. The admixing tank 11 is mounted on skid 75 so as to be transportable. The use of electric motor 71 presupposes, however, that electric power will be available so the site will not be too remote from civilization.

In the embodiment of FIG. 5, the inlet conduit 41 is employed for mixing the quicklime below the surface of the water. As described hereinbefore this subsurface mixing, combined with the spiral mixing paddles is adequate to effect complete mixing. As indicated hereinbefore, a load of quicklime can be connected, as by tubing from a hopper, through the inlet conduit 41. Ordinarily, it may be blown by pneumatic transport into the inlet conduit 41.

If desired, safety controls may be employed to add water automatically if the temperature exceeds a preset temperature. For example, about 195° F. is about ideal maximum temperature for the hot lime slurry. Accordingly, the temperature controls could be set such that if the temperature became as high as 210° F., the thermostat T would automatically turn on control 81 to vent water into the tank.

If desired, suitable heat exchangers can be employed to help vent heat either from the hot lime slurry to prevent its rising above its maximum control temperature or to cool the hydraulic fluid used in the hydraulic drive 73.

One of the particular advantages of this invention is that the elevated temperature lime slurry can be worked into the soil, or surface layers, and become efficacious even in cold seasons and in relatively cool earth surface layers that would not have been conducive to the cementing action of the cold slurries of the prior art. Specifically, the lime slurries at a temperature above ambient; for example, above 100° F., can be worked into the surface layers to effect cementing action even at ambient temperature below about 40° F. whereas in the prior art at temperatures below about 40° F., there was very little cementing action. With the elevated temperature lime slurry of this invention the cementing action is substantially immediate even in the cold weather; but especially in warmer seasons. Many researchers in lime stabilization have recognized that lime reactions are temperature dependent and that higher temperatures would produce better reactions; but achieving the higher temperatures was economically infeasible before this invention.

One of the advantages of this invention is that quicklime is not only more economical and more readily available but forms a larger quantity of slaked lime. Depending upon the source of lime there is a conversion factor of about 1.20 to 1.25. For example, about 30,000 pounds of quicklime will produce about 40,000 pounds of hydrated lime, increasing the economic advantages of this invention. Heretofore, it was deemed infeasible and too hazardous to try to slake quicklime outside of specially constructed slaking plants and in a mixing tank as is done in this invention.

The following examples illustrate applications of this invention.

EXAMPLE I

A small test tank was equipped with agitators for mixing the slurry and keeping the lime in suspension. The temperature of the water in the test tank was 76° F. Quicklime was added and the temperature rose rapidly to 163° F. It was found that the pebble quicklime would react quickly when added to the water. Other admixing was done and the temperature varied from about 160° F. to as much as 196° F.

Because of the elevated temperatures safety improvements were made. For example, hoses to transport equipment were brought into the rear of the unit such that the operator would not be scalded if there was a break of the conduit. No personnel were allowed to climb on the tank during mixing or get near one of the man holes while the quicklime was being slaked.

EXAMPLE II

The hot lime slurry formed in the quicklime mixing tanks in accordance with this invention are transported by suitable transport truck and sprayed on the surface of the layer that has been graded by a grader. The hot lime is sprayed over the surface and into the soil layer. Thereafter, the layer of soil is graded back into position with suitable mixing. A desirable stabilized surface layer is formed.

EXAMPLE III

A load of 15 tons of quicklime was slaked in a mixing tank to produce an equivalent yield of 20 tons of hydrated lime. In this admixing operation water was first added to the tank and the quicklime added below the surface of the water. The slurry that was formed produced a temperature hot enough to blister the paint on the mixing tank, since it was not a heat resistant paint. A rock trap such as screen chamber 51 was put into the suction line to stop interruption due to the forming of rocks of lime that blocked the suction lines. Quick disconnect type connections were employed to enable quickly and safely disconnecting the lines and emptying the rock trap.

The hot lime slurry is advantageously worked into the surface layers by suitable disc with the spray manifold thereabove for satisfactory results.

EXAMPLE IV

Another load of quicklime was slaked. Initial water temperature was 84° F. After mixing the temperature was 196° F.

A day later the temperature was 160° F. and on the following day the temperature was 158° F. It was during this series of mixings that it was found desirable to employ the initial admixing below water level with a second stage of admixing in which the lime was blown in at approximately 15° angle over a perforated baffle that was designed to distribute the lime to prevent build-ups in any given area. Also, the mixing tank agitators were redesigned to have a large center shaft with paddles arranged to create a spiral conveyor to move the slurry from one end along the bottom to the other end and return liquid slurry along the top toward the other end. Flexible, heat resistant wipers including rubber were added to the paddles to create wiping action and prevent build-up on the inside of the tank. The rubber wipers preferably are of the belt type in which heat resistant fibers are included. It was found desirable to employ a valve just outside the tank on the suction lines, since otherwise the suction line would be stopped up during the slaking process.

From the foregoing it can be seen that this invention achieves the objects delineated hereinbefore. Specifically, it provides the following advantages.

1. There is a cost savings in that approximately 15 tons of quicklime can be used instead of 20 tons of hydrated lime.

2. There is ready availability. In many instances hydrated lime is not available at certain times of the year in certain locations; whereas quicklime is nearly always available.

3. There is an extended working season. Work in certain parts of the United States has to be discontinued early in the fall due to cold weather. The elevated temperature slurry of the invention will extend that season. Moreover, the elevated temperature slurry provides faster chemical reactions and helps insure a full reaction.

4. Raw material is easier to unload. Much of the work is in stabilizing roadbeds or other surfaces and requires lime to be unloaded from hopper cars or the like. Hydrated lime is difficult to unload due to its critical angle of repose. Quicklime in the form of pellets and is much easier to unload.

5. This invention achieves improved quality because of faster reactions in the soil, due to the elevated temperature of the slurry.

Having thus described the invention, it will be understood that such description has been given by way of example and illustration and not by way of limitation, reference for the latter purpose being had to the appended claims.

What is claimed is:

1. A method of treating top surface layers of the earth for forming a stabilized base of controlled strength, movement and water permeability comprising the steps of:
  a. admixing in a slurry mixing tank unslaked lime called quicklime and water to form a hot hydrated lime slurry at elevated temperature above ambient; and
  b. working the hot hydrated lime slurry before said hot hydrated lime slurry cools below ambient temperature and while said hot hydrated lime slurry is at a temperature above ambient into the top surface layers of the earth such that for the first time it is economically feasible that said surface layers are treated in situ with a hot lime slurry to obtain the desired strength and stabilization to allow stabilization even when the ambient temperature decreases to 40° F. and lower.

2. The method of claim 1 wherein the admixing of step (a) is performed by adding water to a predetermined level in said mixing tank; initially adding the quicklime at a second predetermined distance below the surface of said water in said mixing tank while simultaneously stirring said water and quicklime to obtain a more nearly uniform distribution of said quicklime and temperature throughout than would otherwise be obtained to assure maximum slaking; continuing said adding of said quicklime below the surface of said water and mixing until the temperature is increased to within the range of 140°–160° F. to form a hot dilute slurry; and, thereafter, injecting said quicklime more rapidly into, and onto both forward and rearward portions of the surface of said hot dilute slurry and thoroughly mixing to prevent forming dangerous crust and steam built-up, until the desired proportion of lime is formed in the final slurry.

3. The method of claim 2 wherein said final slurry is passed through a screen for removing unslaked lime particles that are not efficacious in the surface working procedure before the final slurry is worked into the surface of the earth formations.

4. The method of claim 2 wherein said mixing is performed by a plurality of paddles arranged in at least one spiral and affixed to a power shaft for rotation to pull the particles of slaked and unslaked lime along the bottom of said mixing tank toward one end and effect a return of slurry along the top of the slurry toward the other end for nearly uniform admixture.

5. The method of claim 2 wherein an air conduit is provided adjacent the suction line from the mixing tank for unstopping the suction lines by blowing debris from the entry thereinto.

6. The method of claim 1 wherein said working of said slurry into said top surface layers of the earth in accordance with step (b) is carried out before said hot hydrated lime slurry has cooled below the temperature of the earth's surface layers and while said final hot hydrated lime slurry is hotter than the temperature of the earth's surface layers so as to facilitate obtaining the desired stabilization more readily than would otherwise occur.

7. The method of claim 1 wherein said admixing of step (a) is performed by adding water to a predetermined level in said tank and adding the quicklime at a second predetermined distance below the surface of the water in the mixing tank while simultaneously stirring the water and quicklime to obtain a more nearly uniform distribution of said quicklime and temperature through out than would otherwise be obtained to secure maximum slaking of the quicklime.

* * * * * ptimiz# REEXAMINATION CERTIFICATE (790th)

United States Patent
Teague et al.

[11] B1 4,329,090
[45] Certificate Issued Dec. 8, 1987

[54] EMPLOYING QUICKLIME IN STABILIZING SURFACE LAYERS OF THE EARTH

[75] Inventors: Joe D. Teague, Fort Worth; Paul J. Wright, Euless, both of Tex.

[73] Assignee: Porta Batch Co., Fort Worth, Tex.

Reexamination Request:
No. 90/001,086, Sep. 12, 1986
No. 90/001,153, Jan. 20, 1987

Reexamination Certificate for:
Patent No.: 4,329,090
Issued: May 11, 1982
Appl. No.: 109,791
Filed: Jan. 7, 1980

Related U.S. Application Data

[63] Continuation-in-part of Ser. No. 969,421, Dec. 14, 1978, Pat. No. 4,233,015.

[51] Int. Cl.⁴ .............................................. E02D 3/12
[52] U.S. Cl. .................................... 405/263; 210/219; 366/7; 106/900
[58] Field of Search ............... 405/263, 266, 267, 264; 106/74, 76, 78, 84, 900

[56] References Cited

PUBLICATIONS

*Chemistry and Technology of Lime and Limestone* by Robert S. Boynton, Copyright 1966.
*Lime Stabilization Construction Manual*, published by National Lime Association, Washington, D.C., Fifth edition, published 1972.
*Lime Handling Application and Storage*, published by National Lime Association, bulletin No. 213, Copyright 1949.
*Handbook for Railroad Track Stabilization Using Lime Slurry Pressure Injection*, by Blacklock, et al., published Mar., 1977 and acknowledging at numerous pages therein the state of the art at various time periods prior thereto.
*Pressure Injection Lime Treatment of Swelling Soils* by Thompson, et al., delivered as published speech to the 54th Annual Meeting, Transportation Research Board, Washington, D.C., Jan., 1975.
Transportation Research Record No. 568, published by the Transportation Research Board, entitled, *Swelling Soils*, by Thompson, et al., a printed publication constituting a substantial duplicate of the above identified speech.
*Lime Stabilization Construction Manual*, published by National Lime Association, Washington, D.C., Third edition, published 1969.
Lime Stabilization of Roads, bulletin 323, published by National Lime Association, Washington, D.C., first edition.
Lime Stabilization Construction, bulletin 326, published by National Lime Association, Washington, D.C., sixth edition, 1976.
Transportation Research Circular, published by the Transportation Research Board, entitled State of the Art: Lime Stabilization; No. 180, Sep. 1976.
Woodbine Lines, Lime Slurry Pressure Injection Soil Stabilization System for Expansive Clays, vol. 2, No. 2, Sep. 1970.

*Primary Examiner*—Dennis L. Taylor

[57] ABSTRACT

This specification discloses method and apparatus for treating surface layers of the earth to obtain stabilization, build strength and permeability characteristics; characterized by slaking quicklime (CaO) in a mixing tank to form an elevated temperature, hydrated lime [Ca(OH)$_2$] slurry and working the resulting elevated temperature lime slurry into the surface of the earth at the local where the stabilization of the soil is to be achieved. This achieves a cost reduction, has greater reliability in obtaining materials, achieves better results, saves energy and extends the soil-stabilization season into cold weather previously considered prohibitive. Also disclosed are the details of preferred embodiments for admixing the unslaked lime.

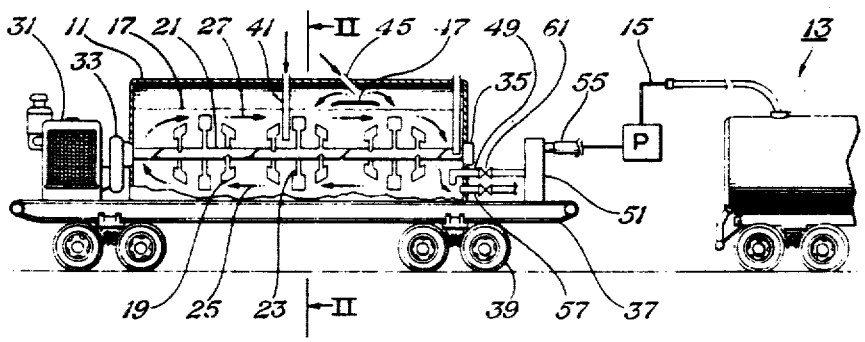

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *